United States Patent
Li et al.

(10) Patent No.: US 11,505,426 B2
(45) Date of Patent: Nov. 22, 2022

(54) BRAKE DEVICE, A TEST METHOD FOR THE BRAKE DEVICE AND AN ELEVATOR SYSTEM

(71) Applicant: Otis Elevator Company, Farmington, CT (US)

(72) Inventors: GuoSong Li, Tianjin (CN); Hua Zhou, Tianjin (CN); Zixu Zhang, Tianjin (CN)

(73) Assignee: OTIS ELEVATOR COMPANY, Farmington, CT (US)

( * ) Notice: Subject to any disclaimer, the term of this patent is extended or adjusted under 35 U.S.C. 154(b) by 240 days.

(21) Appl. No.: 16/707,983

(22) Filed: Dec. 9, 2019

(65) Prior Publication Data

US 2020/0180906 A1 Jun. 11, 2020

(30) Foreign Application Priority Data

Dec. 10, 2018 (CN) .......................... 201811502796.5

(51) Int. Cl.
*B66B 5/00* (2006.01)
*B66B 5/16* (2006.01)
*F16D 66/00* (2006.01)

(52) U.S. Cl.
CPC .............. *B66B 5/0025* (2013.01); *B66B 5/16* (2013.01); *F16D 66/00* (2013.01); *F16D 2066/003* (2013.01)

(58) Field of Classification Search
CPC ......... B66B 5/0025; B66B 5/16; F16D 66/00; F16D 2066/003
See application file for complete search history.

(56) References Cited

U.S. PATENT DOCUMENTS

| 3,975,706 A | 8/1976 | Kato | |
| 5,419,415 A * | 5/1995 | Lamb | B66B 5/0006 116/208 |
| 9,233,818 B2 * | 1/2016 | Ekholm | B60T 17/18 |
| 9,791,009 B2 * | 10/2017 | Hubbard | F16D 66/00 |

(Continued)

FOREIGN PATENT DOCUMENTS

| CN | 107814288 A | 3/2018 |
| DE | 3739836 A1 | 6/1989 |

(Continued)

OTHER PUBLICATIONS

European Search Report for Application No. 19215015.9; dated May 14, 2020; 8 Pages.

*Primary Examiner* — Robert A. Siconolfi
*Assistant Examiner* — James K Hsiao
(74) *Attorney, Agent, or Firm* — Cantor Colburn LLP

(57) ABSTRACT

A brake device includes: a fixed member; a moving member which is movable between a retracted position in which the moving member is adjacent to the fixed member and separate from a braking member, and a braking position in which a friction plate of the moving member contacts the braking member and provides a braking force to the braking member; an elastic member connected between the moving member and the fixed member; a coil disposed in the fixed member; and a controller which provides an operating current to the coil when the elevator is in normal operation, wherein the controller is configured to implement a test mode in which the controller provides a test current less than the operating current to the coil and determines whether the moving member has been attracted to the retracted position.

12 Claims, 4 Drawing Sheets

(56) References Cited

U.S. PATENT DOCUMENTS

| | | | |
|---|---|---|---|
| 9,803,712 B2* | 10/2017 | Jantunen | F16D 66/00 |
| 9,933,034 B2* | 4/2018 | Saito | F16D 66/022 |
| 10,023,428 B2 | 7/2018 | May | |
| 10,087,045 B2 | 10/2018 | Stolt et al. | |
| 10,267,698 B2* | 4/2019 | Schmid | G01L 5/28 |
| 2006/0175153 A1* | 8/2006 | Hubbard | B66B 5/0018 |
| | | | 188/1.11 E |
| 2008/0185231 A1* | 8/2008 | Osterman | B66B 5/0031 |
| | | | 187/393 |
| 2010/0154527 A1* | 6/2010 | Illan | B66B 5/0093 |
| | | | 73/121 |
| 2012/0217100 A1* | 8/2012 | Spirgi | B66B 5/0025 |
| | | | 187/393 |
| 2013/0133984 A1* | 5/2013 | Osmanbasic | B66B 5/18 |
| | | | 187/306 |
| 2014/0311257 A1* | 10/2014 | Hubbard | B66B 5/0037 |
| | | | 73/862.12 |
| 2015/0047426 A1* | 2/2015 | Ekholm | B60T 17/18 |
| | | | 73/121 |
| 2015/0252861 A1* | 9/2015 | Jantunen | F16D 66/00 |
| | | | 324/537 |
| 2017/0313550 A1* | 11/2017 | Vakkamaki | B66B 5/0025 |
| 2018/0134517 A1 | 5/2018 | Zhou | |

FOREIGN PATENT DOCUMENTS

| | | |
|---|---|---|
| DE | 102012008547 A1 | 12/2012 |
| DE | 102012007863 A1 | 10/2013 |
| EP | 2344781 B1 | 10/2017 |
| JP | 2000095460 A | 4/2000 |
| JP | 2008168981 A | 7/2008 |
| WO | 2018092322 A1 | 11/2016 |

\* cited by examiner

BRAKE DEVICE, A TEST METHOD FOR THE BRAKE DEVICE AND AN ELEVATOR SYSTEM

FOREIGN PRIORITY

This application claims priority to Chinese Patent Application No. 201811502796.5, filed Dec. 10, 2018, and all the benefits accruing therefrom under 35 U.S.C. § 119, the contents of which in its entirety are herein incorporated by reference.

FIELD OF THE INVENTION

The present disclosure relates to the field of elevators, and in particular to a method for testing an elevator brake device, a brake device, and an elevator system.

BACKGROUND OF THE INVENTION

In an elevator system, a normally closed brake device is usually used. The brake device includes a fixed member and a moving member, and an elastic member such as a spring is disposed between the fixed member and the moving member to tend to hold the moving member at a braking position. When a coil on the fixed member is energized, the moving member will be attracted by a magnetic field generated by the coil to overcome an elastic force of the elastic member to move to a retracted position, thereby releasing a braking member, such as a brake disc or a brake wheel, and enabling the elevator to operate. With the operation of the elevator, a friction plate on the moving member of the elevator will be gradually worn out. Usually, a feeler gauge is used to manually detect an air gap between the moving member and the fixed member to estimate the degree of wear of the friction plate.

SUMMARY OF THE INVENTION

An object of the present disclosure is to solve or at least alleviate the problems in the prior art.

In one aspect, a brake device for an elevator is provided by the present disclosure, which includes: a fixed member; a moving member which is movable between a retracted position in which the moving member is adjacent to the fixed member and separate from a braking member, and a braking position in which a friction plate of the moving member contacts the braking member and provides a braking force to the braking member; an elastic member connected between the moving member and the fixed member, the elastic member tending to urge the moving member toward the braking position; a coil disposed in the fixed member, the coil generating a magnetic field when being energized to attract the moving member to move toward the retracted position; and a controller which provides an operating current $I_1$ to the coil when the elevator is in normal operation, wherein the controller is configured to implement a test mode in which the controller provides a test current $I_2$ less than the operating current $I_1$ to the coil and determines whether the moving member has been attracted to the retracted position.

Optionally, in the brake device, the controller is configured to implement the test mode periodically.

Optionally, in the brake device, the controller confirms that an elevator car has stopped and is unloaded before implementing the test mode.

Optionally, in the brake device, in the test mode, the controller resumes normal operation of the elevator in a case that the moving member has been attracted to the retracted position, and sends prompt information and/or controls the elevator to stop operating in a case that the moving member fails to be attracted to the retracted position.

Optionally, in the brake device, the test current $I_2$ is 50%-95% of the operating current $I_1$.

Optionally, in the brake device, the controller provides the test current $I_2$ less than the operating current $I_1$ in the test mode by lowering a supply voltage.

Optionally, in the brake device, the controller provides a first test current $I_{21}$ less than the operating current to the coil in the test mode and determines whether the moving member has been attracted to the retracted position; in a case that the moving member has been attracted to the retracted position, the controller resumes normal operation of the elevator, and in a case that the moving member fails to be attracted to the retracted position, the controller sends prompt information and provides a second test current $I_{22}$ to the coil, wherein $I_{21} < I_{22} < I_1$, and the controller determines whether the moving member has been attracted to the retracted position; in a case that the moving member has been attracted to the retracted position, the controller resumes normal operation of the elevator, and in a case that the moving member fails to be attracted to the retracted position, the controller controls the elevator to stop operating.

According to some aspects, an elevator system is further provided, which includes the brake device described in various embodiments.

According to some aspects, a method for testing an elevator brake device is further provided, which includes: implementing a test mode when a moving member is in a braking position; providing a test current $I_2$ to a coil in a fixed member, the test current $I_2$ being less than an operating current $I_1$ provided to the coil when the elevator is in normal operation; and determining whether the moving member is capable of being attracted to a retracted position.

Optionally, the method further includes implementing the test mode in a case that an elevator car has stopped and is unloaded.

Optionally, the method further includes resuming normal operation of the elevator in a case that the moving member has been attracted to the retracted position, and sending prompt information and/or controlling the elevator to stop operating in a case that the moving member fails to be attracted to the retracted position.

Optionally, the method further includes setting the test current $I_2$ to be 50%-95% of the operating current $I_1$.

Optionally, the method further includes providing the test current $I_2$ less than the operating current $I_1$ in the test mode by lowering a supply voltage.

Optionally, the method further includes: providing a first test current $I_{21}$ less than the operating current to the coil in the test mode and determining whether the moving member has been attracted to the retracted position; resuming normal operation of the elevator in a case that the moving member has been attracted to the retracted position; sending prompt information in a case that the moving member fails to be attracted to the retracted position, providing a second test current $I_{22}$ to the coil by the controller, wherein $I_{21} < I_{22} < I_1$, and determining whether the moving member has been attracted to the retracted position; resuming normal operation of the elevator in a case that the moving member has been attracted to the retracted position, and controlling the elevator to stop operating in a case that the moving member fails to be attracted to the retracted position.

BRIEF DESCRIPTION OF THE DRAWINGS

The contents of the present disclosure will become more easily understood with reference to the accompanying drawings. Those skilled in the art can readily appreciate that the drawings are for illustrative purposes only, instead of being intended to limit the scope of protection of the present disclosure. In addition, similar numbers in the drawings are used to indicate similar parts, wherein.

DETAILED DESCRIPTION OF THE EMBODIMENT(S) OF THE INVENTION

It will be readily understood that, based on the technical solutions of the present disclosure, those skilled in the art can propose various alternative embodiments and implementations without departing from the true spirit of the present disclosure. Therefore, the following specific embodiments and the accompanying drawings are merely exemplary description of the technical solutions of the present disclosure, which shall not be deemed as the whole of the present disclosure or as limiting or restricting the technical solutions of the present disclosure.

Such orientation terms as upper, lower, left, right, front, rear, front side, back side, top, bottom or the like that are mentioned or may be mentioned in this description are defined with respect to the configurations shown in the individual drawings. They are relative concepts and thus possibly vary according to their different locations and different usage states. Therefore, these or other orientation terms shall not be interpreted as limiting terms.

Figure 1:
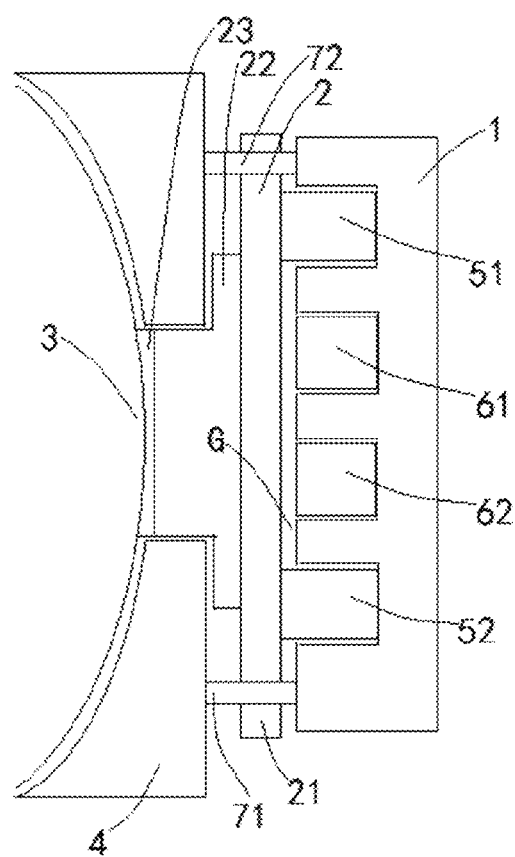
FIG. 1 shows a schematic view of a brake device according to an embodiment of the present disclosure in a braking state.
Figure 2:
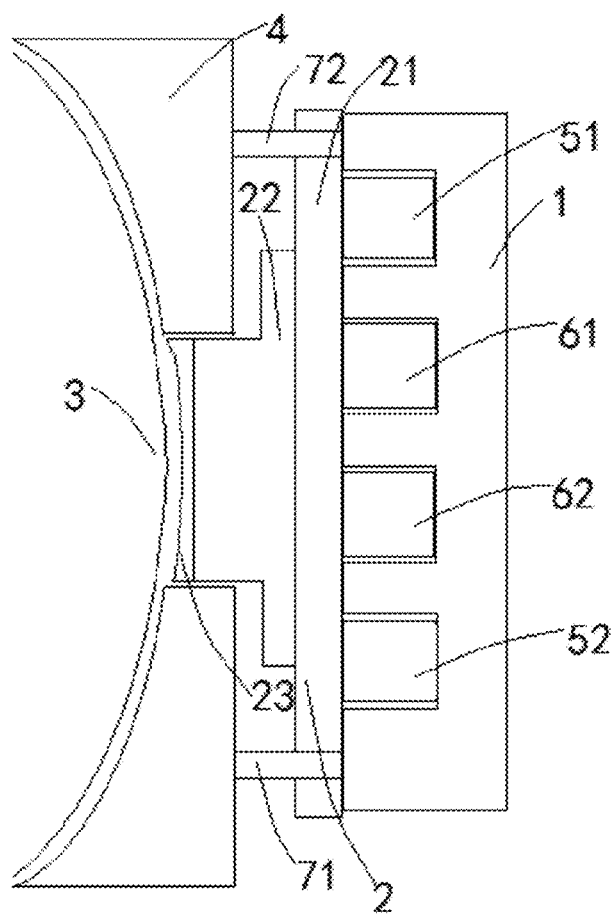
FIG. 2 shows a schematic view of the brake device according to the embodiment of the present disclosure in a retracted state.

First, referring to FIGS. 1 and 2, schematic views of a brake device according to an embodiment of the present disclosure are shown in a braking state and a retracted state respectively. The brake device mainly includes: a fixed member 1, a moving member 2 and a braking member 3. The fixed member 1 is for example fixedly installed in a machine room, and the moving member 2 may include a plate body 21, a friction plate holder 22, and a friction plate 23. The moving member 2 is movable between a braking position shown in FIG. 1 and a retracted position shown in FIG. 2. For example, in the illustrated embodiment, a movement of the moving member 2 is guided by pins 71 and 72. In the braking position, the friction plate 23 of the moving member 2 is in contact with the braking member 3 and provides a braking force to the braking member 3. The braking member 3 may for example be a wheel or a disc, which may be directly or indirectly connected to a traction machine which provides power to the elevator. The moving member 2 is engaged with the braking member 3 and provides a braking force by friction, thereby stopping the elevator. At this point, there is a certain gap G between the moving member 2 and the fixed member 1, which is hereinafter referred to as air gap G. With the use of the elevator brake device, the friction plate 23 will be gradually worn, and the air gap G therefore will gradually increase. When the moving member 2 is in the retracted position shown in FIG. 2, the moving member 2 is close to the fixed member 1 and separated from the braking member 3, so that the braking member 3 is released to allow the movement of the elevator car. In the present embodiment, the brake device is a normally closed brake device, wherein elastic members 51 and 52 are disposed between the moving member 2 and the fixed member 1, and the elastic members are intended to tend to push the moving member 2 toward the braking position. Due to the elastic members 51 and 52, the brake device will also function when the elevator is unexpectedly powered off. In addition, coils 61 and 62 are disposed in the fixed member 1, and they will generate a magnetic field when energized, so as to attract the moving member 2 to move toward the retracted position. In addition, the brake device further includes a controller that provides an operating current $I_1$ to the coils 61 and 62 during operation of the elevator to operate the brake device to function, such as braking or releasing the braking member 3 during normal operation. In an embodiment of the present disclosure, the controller is further configured to be capable of implementing a test mode in which the controller provides a test current $I_2$ less than the operating current $I_1$ to the coils 61 and 62 and determines whether the moving member 2 has been attracted to the retracted position. The degree of wear of the friction piece 23 of the moving member 2 can be qualitatively tested based on whether the moving member 2 can be attracted in case of reduced current.

Figure 3:
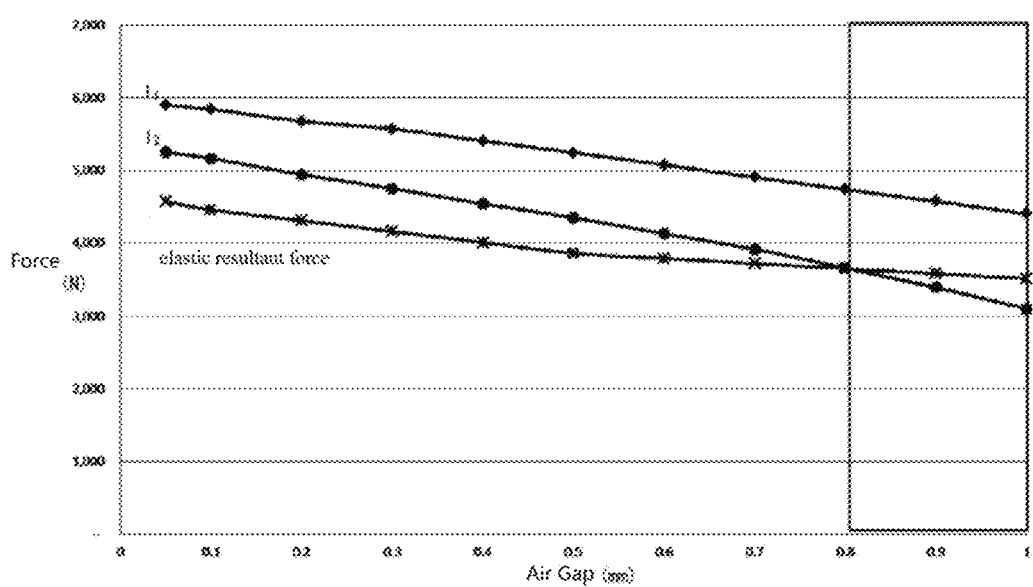
FIG. 3 shows a relationship of an air gap and a force in the braking state when different currents are applied.

The principle of the brake device according to an embodiment of the present disclosure will be explained with continued reference to FIG. 3. As can be seen in FIG. 3, in the case of the normal operating current $I_1$, as the friction plate 23 is worn in use, the air gap G between the moving member 2 and the fixed member 1 in the braking state shown in FIG. 1 will gradually increase, and due to the increase of the air gap G, the attracting force of the magnetic field generated by the coils 61 and 62 in the fixed member 1 to the moving member 2 will gradually decrease, as shown in FIG. 3. On the other hand, as shown in FIG. 3, for the elastic members 51 and 52 (which may include springs and buffer mats, etc.), due to the Hooke's law, the elastic resultant force to the moving member 2 will also decrease as the air gap G increases. In order to ensure the normal operation of the brake device, the operating current $I_1$ is set such that in the case of any air gap G, the attracting force of the coils 61 and 62 of the fixed member 1 to the moving member 2 is significantly greater than the elastic resultant force of the elastic member 51 and 52 to the moving member 2, thereby ensuring that the moving member 2 can be attracted to the retracted position when the coils 61 and 62 are energized. In the test mode, the coils 61 and 62 are supplied with a reduced test current $I_2$, for example $I_2=0.8 \times I_1$. In this case, if the friction plate 23 has not yet been worn to such a degree that the air gap G is greater than a critical value such as 0.8 mm, then in the test mode, the attracting force that the moving member 2 is subjected to will be greater than the elastic resultant force, so the moving member 2 will be attracted to the retracted position, whereas if the friction plate 23 has been worn to such a degree that the air gap G is greater than the critical value such as 0.8 mm, then in the test mode, the attracting force that the moving member 2 is subjected to will be less than the elastic resultant force, so the moving member 2 cannot be attracted to the retracted position. Therefore, it can be determined whether the friction piece is worn to the degree that the air gap is greater than the critical value based on whether the moving piece 2 is attracted to the retracted position in the test mode.

In some embodiments, the test current $I_2$ may depend on the critical value of the air gap G. For example, the test current $I_2$ is obtained by calculation or experiment, and the critical value of the air gap G may be further set based on theoretical calculation and/or practical experience. In some embodiments, the test current $I_2$ is set to be 50%-95% of the operating current $I_1$; in some embodiments, the test current $I_2$ is set to be 60%-90% of the operating current $I_1$; and in some embodiments, the test current $I_2$ is set to be 70%-85% of the operating current $I_1$, and so on. In some embodiments, the controller may provide the test current $I_2$ less than the operating current $I_1$ by reducing the voltage supplied to the coils in the test mode; for example, an additional resistor may be added to the circuit to reduce the voltage supplied to the coils.

In some embodiments, the controller is configured to periodically implement the test mode. For example, the controller may be configured to implement the test mode every day, every week, or every other certain number of days. In some embodiments, the controller is configured to implement the test mode at a particular time, for example during a period of low elevator load, such as implementing the test mode in the early hours of the morning. In some embodiments, the controller is configured to first confirm whether the elevator car is in a stopped and unloaded state when the test time comes. If the elevator car is not unloaded, then the elevator car will not undertake new tasks after the current task is completed. For example, it will stop at a predetermined floor directly to implement the test mode.

In another aspect, an elevator system is further provided by the present disclosure, which includes the brake device described in various embodiments of the present disclosure.

Figure 4:
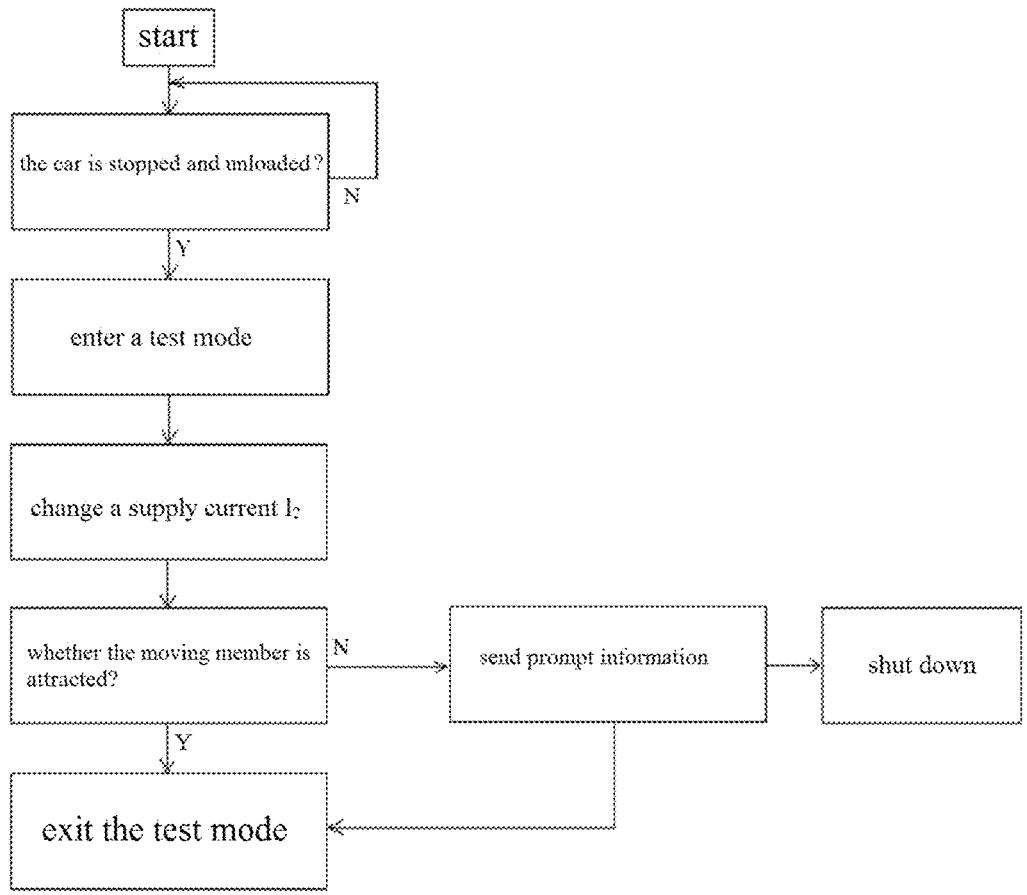
FIGS. 4 and 5 show flowcharts of methods according to embodiments of the present disclosure respectively.

A method of operating the brake device according to an embodiment of the present disclosure will be described with continued reference to FIG. 4. The method may include: implementing a test mode when a moving member is in a braking position; providing a test current $I_2$ to a coil in a fixed member, the test current $I_2$ being less than an operating current $I_1$ provided to the coil when the elevator is in normal operation; and determining whether the moving member is capable of being attracted to a retracted position. In some embodiments, the method further includes implementing the test mode in a case that an elevator car has stopped and is unloaded. In some embodiments, the method further includes resuming normal operation of the elevator in a case that the moving member has been attracted to the retracted position, and sending prompt information in a case that the moving member fails to be attracted to the retracted position. For example, the prompt information is sent to maintenance personnel or elevator management personnel via wireless communication to prompt maintenance, such as replacing the friction plate. Alternatively, if it is determined that the thickness of the friction plate of the moving member is reduced to a lower level which may affect the safety of the elevator, the elevator may be controlled to stop operating, and prompt information may be sent. In some embodiments, the method further includes providing the test current $I_2$ less than the operating current $I_1$ by lowering a supply voltage.

Figure 5:
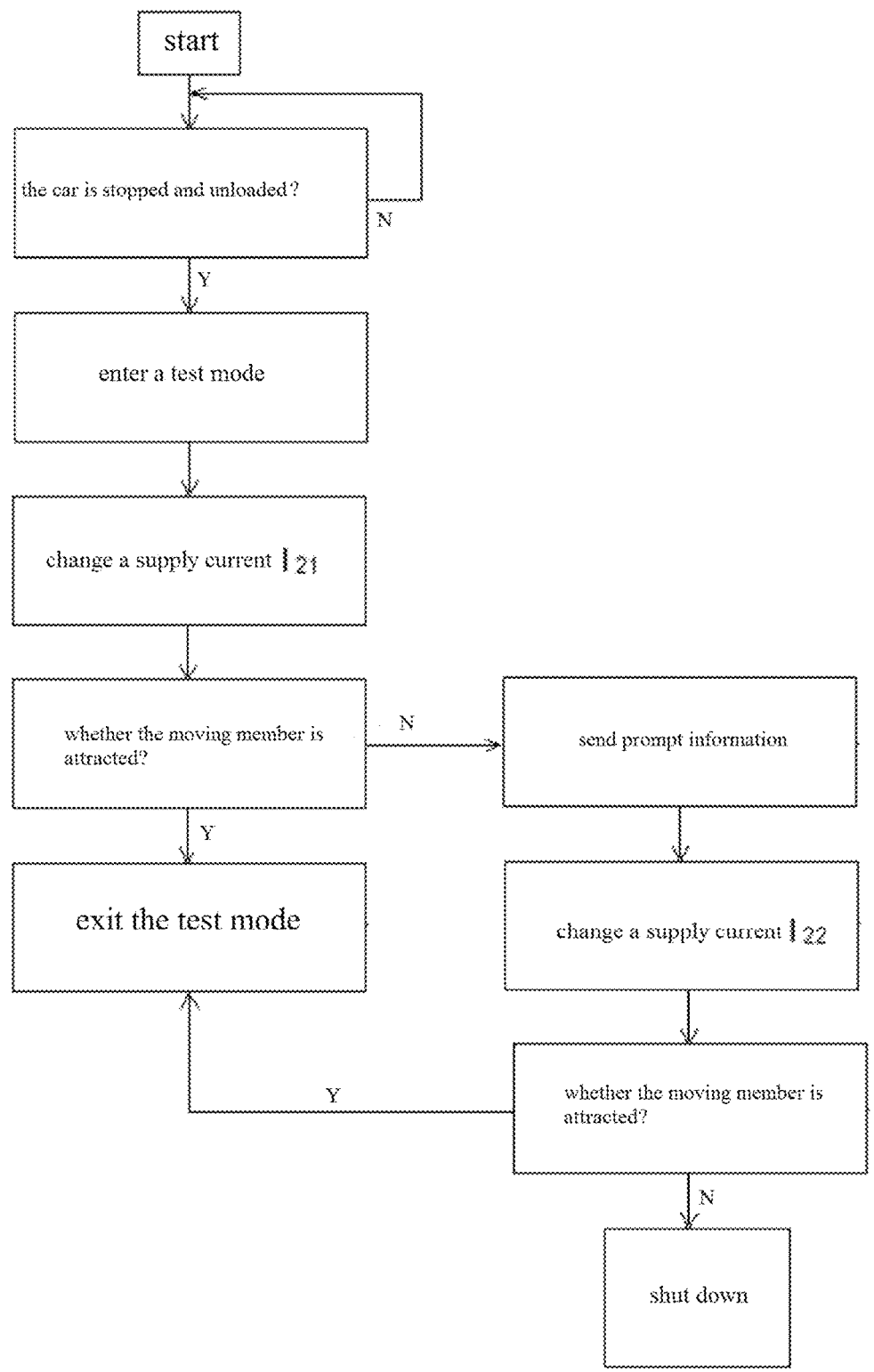

With continued reference to FIG. 5, in a further embodiment, the method further includes: providing a first test current $I_{21}$ less than the operating current to the coil in the test mode and determining whether the moving member has been attracted to the retracted position; resuming normal operation of the elevator in a case that the moving member has been attracted to the retracted position; and sending prompt information in a case that the moving member fails to be attracted to the retracted position. The first test current $I_{21}$ may correspond to a situation in which the friction plate needs to be replaced but the elevator can still operate normally for a period of time. Further, the controller then provides a second test current $I_{22}$ to the coil wherein $I_{21} < I_{22} < I_1$, and it is determined whether the moving member has been attracted to the retracted position; normal operation of the elevator is resumed in a case that the moving member has been attracted to the retracted position, and the controller controls the elevator to stop operating in a case that the moving member fails to be attracted to the retracted position.

The specific embodiments described above are merely for describing the principle of the present disclosure more clearly, and various components are clearly illustrated or depicted to make it easier to understand the principle of the present disclosure. Those skilled in the art can readily make various modifications or changes to the present disclosure without departing from the scope of the present disclosure. It should be understood that these modifications or changes should be included within the scope of protection of the present disclosure.

What is claimed is:

1. A brake device, the brake device being used for an elevator and comprising:
   a fixed member;
   a moving member which is movable between a retracted position in which the moving member is adjacent to the fixed member and separate from a braking member, and a braking position in which a friction plate of the moving member contacts the braking member and provides a braking force to the braking member;
   an elastic member connected between the moving member and the fixed member, the elastic member tending to urge the moving member toward the braking position;
   a coil disposed in the fixed member, the coil generating a magnetic field when being energized to attract the moving member to move toward the retracted position; and
   a controller which provides an operating current to the coil when the elevator is in normal operation, wherein the controller is configured to implement a test mode in which the controller provides a test current less than the operating current to the coil and determines whether the moving member has been attracted to the retracted position;
   wherein in a case that the moving member has been attracted to the retracted position, the controller resumes normal operation of the elevator, and in a case that the moving member fails to be attracted to the retracted position, the controller sends prompt information and provides a second test current to the coil, wherein the test current<the second test current<the operating current, and the controller determines whether the moving member has been attracted to the retracted position; in a case that the moving member has been attracted to the retracted position, the controller resumes normal operation of the elevator, and in a case that the moving member fails to be attracted to the retracted position, the controller controls the elevator to stop operating.

2. The brake device according to claim 1, wherein the controller is configured to implement the test mode periodically.

3. The brake device according to claim 1, wherein the controller confirms that an elevator car has stopped and unloaded before implementing the test mode.

4. A brake device, the brake device being used for an elevator and comprising:
a fixed member;
a moving member which is movable between a retracted position in which the moving member is adjacent to the fixed member and separate from a braking member, and a braking position in which a friction plate of the moving member contacts the braking member and provides a braking force to the braking member;
an elastic member connected between the moving member and the fixed member, the elastic member tending to urge the moving member toward the braking position;
a coil disposed in the fixed member, the coil generating a magnetic field when being energized to attract the moving member to move toward the retracted position; and
a controller which provides an operating current to the coil when the elevator is in normal operation, wherein the controller is configured to implement a test mode in which the controller provides a test current less than the operating current to the coil and determines whether the moving member has been attracted to the retracted position;
wherein in the test mode, the controller resumes normal operation of the elevator in a case that the moving member has been attracted to the retracted position, and sends prompt information and/or controls the elevator to stop operating in a case that the moving member fails to be attracted to the retracted position.

5. The brake device according to claim 1, wherein the test current is 50%-95% of the operating current.

6. The brake device according to claim 1, wherein the controller provides the test current less than the operating current in the test mode by lowering a supply voltage.

7. An elevator system, comprising the brake device according to claim 1.

8. A method for testing a brake device, comprising:
implementing a test mode when a moving member is in a braking position;
providing a test current to a coil in a fixed member, the test current being less than an operating current provided to the coil when the elevator is in normal operation;
determining whether the moving member is capable of being attracted to a retracted position;
resuming normal operation of the elevator in a case that the moving member has been attracted to the retracted position;
sending prompt information in a case that the moving member fails to be attracted to the retracted position, providing a second test current to the coil by the controller, wherein the test current<the second test current<the operating current, and determining whether the moving member has been attracted to the retracted position;
resuming normal operation of the elevator in a case that the moving member has been attracted to the retracted position, and controlling the elevator to stop operating in a case that the moving member fails to be attracted to the retracted position.

9. The method according to claim 8, further comprising implementing the test mode in a case that an elevator car has stopped and is unloaded.

10. A method for testing a brake device, comprising:
implementing a test mode when a moving member is in a braking position;
providing a test current to a coil in a fixed member, the test current being less than an operating current provided to the coil when the elevator is in normal operation;
determining whether the moving member is capable of being attracted to a retracted position;
resuming normal operation of the elevator in a case that the moving member has been attracted to the retracted position, and sending prompt information and/or controlling the elevator to stop operating in a case that the moving member fails to be attracted to the retracted position.

11. The method according to claim 8, further comprising setting the test current to be 50%-95% of the operating current.

12. The method according to claim 8, further comprising providing the test current less than the operating current in the test mode by lowering a supply voltage.

* * * * *